Nov. 29, 1927. 1,650,888
L. DE FLOREZ
TEMPERATURE CONTROL
Filed Feb. 14, 1925 3 Sheets-Sheet 3
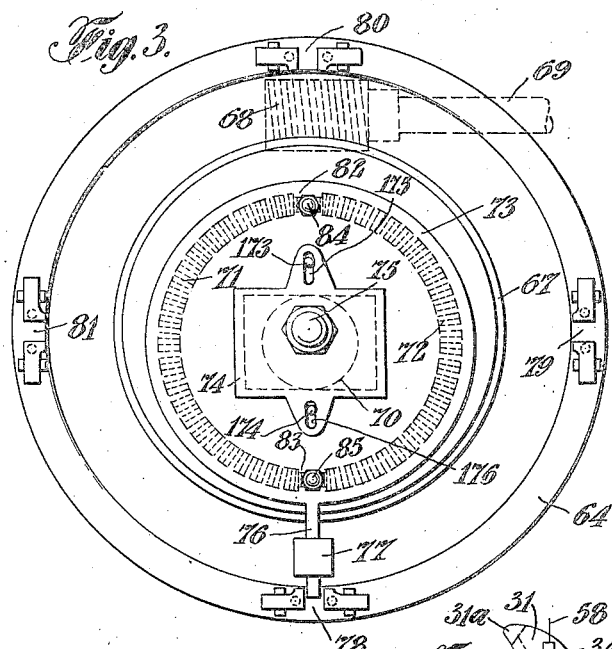
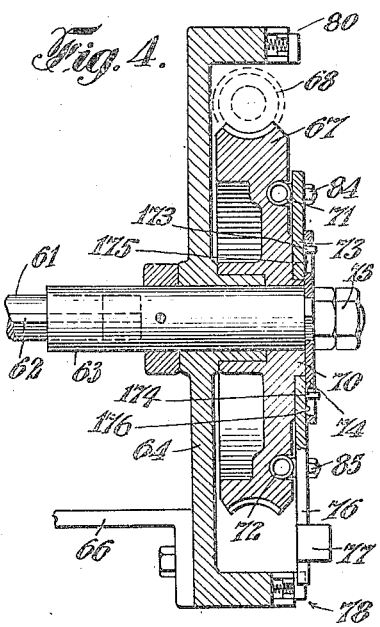
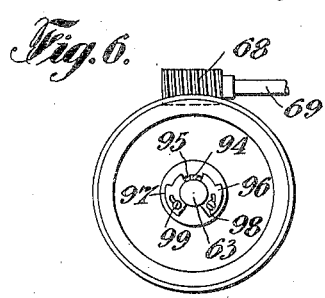
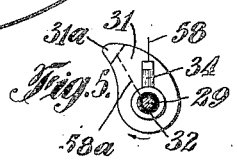
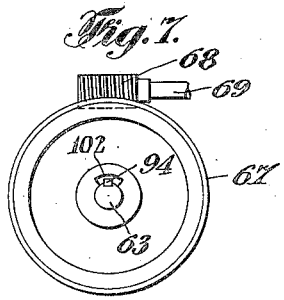
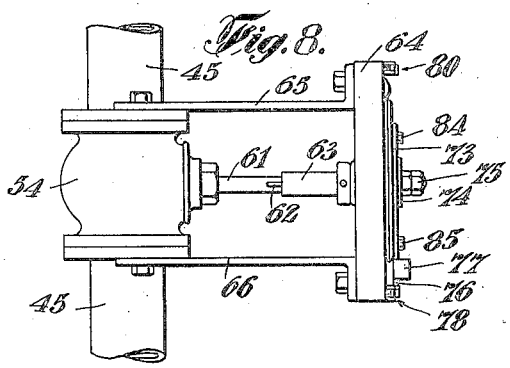
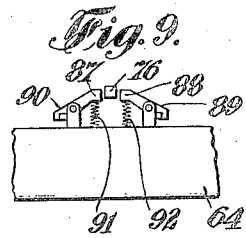
Inventor
Luis de Florez
By his Attorney
Ramsay Hoguet Patented Nov. 29, 1927.

1,650,888

UNITED STATES PATENT OFFICE.

LUIS DE FLOREZ, OF POMFRET, CONNECTICUT, ASSIGNOR, BY MESNE ASSIGNMENTS, TO THE TEXAS COMPANY, OF NEW YORK, N. Y., A CORPORATION OF DELAWARE.

TEMPERATURE CONTROL.

Application filed February 14, 1925. Serial No. 9,360.

My invention relates to the control of a heat modifying medium to maintain or change the temperature of wholly or partially enclosed space and has particular reference to the control of a heat modifying fluid such for instance as a heating or refrigerating fluid which fluid is circulated or discharged within a space, the temperature of which is to be varied or maintained.

In my copending application filed on even date herewith, Serial Number 9,359, I have described a means and method of control whereby control is effected by the integration of a series of control increments to a predetermined amount, the apparatus acting when such predetermined amount is reached to effect, operate or influence another control which may be applied to the same or another medium.

In the present application, I shall illustrate and describe the application of this broad principle to the control of a heat modifying medium. The particular application of the present invention is to the temperature control of a dephlegmator tower such as is used in oil refining in response to variations in temperature of the gases in the dephlegmator. It has been recognized for some time that a dephlegmator tower should operate under predetermined conditions of temperature for which the tower may be designed, in order to secure the greatest efficiency of the tower and to maintain the quality of the product passing from the tower to the condenser. Since most dephlegmating towers are seriously affected by changes in the temperature of the atmosphere in which they operate and by variations in the character of the vapors passing to the tower due to variations in the oil treated or in its method of treatment, it is desirable to maintain the tower at operating conditions of temperature for the particular product under treatment having regard for the character of the product desired. Such a control is illustrated and described in the accompanying specification in which I automatically control the temperature of a tower by a cooling medium circulated in radiator coils within the tower, or discharged therein, to maintain the gases at a desired heat, the control operating in response to variations in the temperature of the gases at any predetermined point in or near the tower. It is essential that in such a system the regulation be made positively, quickly and that the system be such as to control accurately without hunting.

My invention will be clearer and its objects better understood from the following specifications of which the drawings form a part, and in which drawings like numbers refer to like parts throughout.

Fig. 3 is a plan view of the valve-actuating device;

Fig. 4 is a section through the center of Fig. 3;

Fig. 5 is a detail of the cam on shaft 29;

Fig. 6 is a variation of the connection of the worm wheel to the shaft;

Fig. 7 is another variation of the connection of the worm wheel to the shaft;

Fig. 8 is an elevation of valve and the valve-actuating device; and

Fig. 9 is a detail of the latches mounted on the worm wheel casing.

Figure 1:
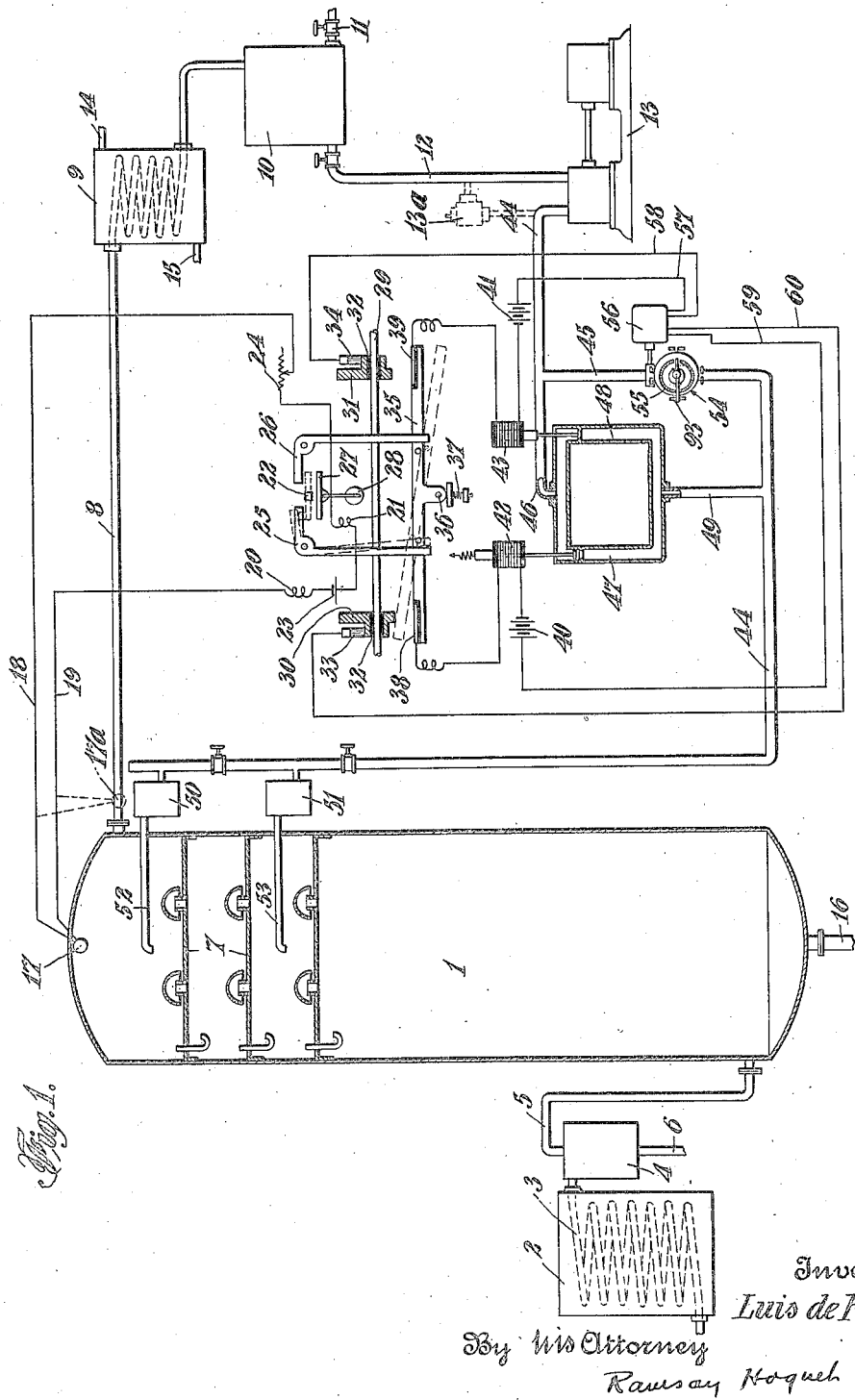
Fig. 1 is an elevation in section of a typical cooling tower, and a diagrammatic lay-out of my apparatus.

In Fig. 1, a tower is shown at 1. This tower is such as is commonly used in the art of distillation and may be equally well of any other type, this being merely for illustration. At 2 is a still or retort, the oil passing through pipes 3 into an expansion chamber 4 from which the vapors pass through pipes 5 into the tower 1. The expansion chamber 4 has an outlet pipe 6, which returns the heavier portions of the vapors to the still or to other disposition as may be desired. The vapors in tower 1 will pass up through the plates 7, through the apertures shown, and will pass out through the pipe 8 into the condenser 9, and ultimately to the storage tank 10. The condensed vapors entering this tank 10 may be discharged through the pipe 11, a portion flowing by gravity through pipe 12 preferably to the pump 13 for the purpose of control. The amount discharged from tank 12 and the amount flowing through the pump 13 will be governed by the conditions of operation. At 13ª is a relief valve for this pump. The condenser 9 has water inlet and outlet pipes 14 and 15. The tower 1 has a discharge outlet 16 from which may be withdrawn any condensed vapor in the tower, and which may be disposed of, as may be desired.

At the top of the tower 1 is a thermocouple 17 having leads 18 and 19 leading to a galvanometer shown diagrammatically by the coils 20 and 21; the needle of this galvanometer being at 22. As is customary, this galvanometer circuit includes a battery 23 and a variable resistance 24, by which the galvanometer may be set at its zero reading and the needle be at that point. Consequently, the changes in temperature affecting the thermo-couple 17, which may be at any other point such as 17$^a$, will cause a movement of the galvanometer needle 22 to one side or to the other, depending upon whether the temperature is too high or too low. Pivoted on each side of the galvanometer needle as shown are two bell cranks 25 and 26, and directly under the needle is a chopper 27 actuated by the crank or eccentric 28. This chopper is in continuous movement in a vertical direction at a predetermined rate. Mounted on the shaft 29 are two cams 30 and 31 of the same contour and which are insulated from shaft 29 by the insulation 32. On the hub of these two cams are brushes 33 and 34. The details of these cams and brushes are shown in Fig. 5. Directly below the shaft 29 is the bar 35, which is pivoted at 36 so as to turn about this pivot, but free motion of this bar is braked by suitable means such as the spring and contact 37. On the ends of this bar 35 are contact pieces 38 and 39, which are insulated from the bar as shown. The brushes 33 and 34 and the contact pieces 38 and 39 are in a series circuit with the batteries 40 and 41 and the solenoids 42 and 43, so that these circuits are not closed nor the solenoids actuated unless there is contact between one of the cams and its contact piece.

As previously stated the condensed vapors pass to the storage tank 10, a portion of the condensate going to the pump 13. This pump has a discharge outlet 44, and this outlet is divided between the main discharge pipe 45 and the auxiliary by-pass pipe 46. This auxiliary pipe has two branches 47 and 48, which are governed by the solenoids 42 and 43 acting upon valves as shown. The auxiliary pipes 47 and 48 meet in a common pipe 49 which in turn re-enters the main pipe 44. This valve 44 supplies the equalization tanks 50 and 51 to supply the outlets 52 and 53. It will be understood that any number of these outlets may be employed and there will customarily be an equalization tank for each, although these tanks are not essential and the outlets may be operated without them. I merely show a preferred form of tower and accessories in order better to explain my invention. It will thus be seen that by passing a portion of the condensed vapors back through the pump and then passing them into the tower, I can govern the temperature of that tower by varying the amount of condensed vapors returned to act as a cooling and cleansing medium. It is in the control of a cooling medium such as this that my invention lies.

In the foregoing, I have described the cams 30 and 31 as having the contour as shown in Fig. 5 where the time of their contact is governed by their contour. I may desire in some instances to have an intermittent but constant time of contact and if so, I can make the body of the cam of insulating material and provide a contact such as 31$^a$ at the tips of the cam and a lead 58$^a$ from that contact to the conducting hub and brushes 34. Many other ways may be used to secure the same result, and I explain this way merely by way of illustration.

The solenoids 42 and 43 actuate valves concentric with the cores to open or close each valve as the case may be and according to whether or not the particular solenoid is energized, so that the control of the auxiliary pipes 47 and 48 lies in these valves and the amount of fluid passing through them depends entirely upon whether one or both are open or whether both are closed. The main supply of the fluid through the pipe 44 is controlled by the valve 54, which is actuated by a special mechanism 55 and which in turn is driven by the motor 56. This motor 56 has leads 57 and 58 which are in series with the battery 41, the solenoid 43, the contact piece 39 and the brush 34. There are also leads 59 and 60 which are in series with the battery 40, the solenoid 42, the contact piece 38 and the brush 33. The motor 56 being reversible, its direction of rotation will depend upon which of the circuits is closed by the cams 30 or 31 during their rotation, or if neither cam is operative in relation to its contact piece on the bar 35, the motor will not run. From the foregoing it is clear that I have a dual control of the fluid from the pump 13 of which the valve 54 and its mechanism comprise the major control and the solenoid valves 42 and 43 comprise the minor control. In other words, the valve 54 establishes the temperature and the auxiliary valves 42 and 43 act to maintain their temperature through the aforesaid minor control of the fluid passing through the pipes 47 and 48.

The valve 54 (see Figs. 3, 4 and 8) has its spindle 61 fitted with a key as at 62. This spindle fits into a sleeve or extension 63, which has a bearing in the casing 64; this casing being supported on the valve by the braces 65 and 66, as in Fig. 8. Loosely mounted on this extension or hub 63 is a worm wheel 67, with which a worm 68 engages and which in turn is connected to the motor 56 through the shaft 69. Consequently this worm wheel 67 will rotate in a direction determined by the direction of rotation of the motor 56. Cut on the face of this worm wheel is a cam 70; that is, the cam is integral with the worm wheel. Also in the face of this worm wheel 67 is cut a circular channel which is concentric with the cam 70, and in which fit two coil springs 71 and 72. Also concentric with this cam is a plate 73 held in place by the plate 74 which in turn is retained by the nut 75.

The plate 74 is keyed or otherwise fixed to the sleeve 63 and thus the valve spindle 61. On plate 73 are two studs 173 and 174 which work in slots 175 and 176 in the plate 74. As the spindle 61 and the plate 73 are not concentric, the eccentric movement of plate 73 is taken care of by the movement of the pins in the slots and therefore plates 73 and 74 will move together and turn the valve spindle 61 whenever such movement occurs.

The plate 73 has an extending arm 76 upon which is a weight 77. This arm 76 extends to overlap the casing 64. Disposed about the periphery of the casing 64 are latches 78, 79, 80 and 81. While I show four of these latches, their number may be varied at will and there may be any number greater or less than four according to the conditions of operation. It will be noticed that the channel in which the springs 71 and 72 rest has reduced portions at 82 and 83 so that these springs are limited in their extended movement by these two contracted portions. The plate 73 has two diametrically opposite bolts 84 and 85 which extend down into the channel and which hold the springs 71 and 72, so that any movement of the worm wheel 67 with respect to the plate 73 would tend to compress the springs because the opposite end of each spring from the reduced portions 82 and 83 is held by the bolts 84 and 85.

There are latches 78, 79, 80 and 81 mounted on the periphery of the casing 64. These latches are shown in detail in Fig. 9 and are composed of two pivoted latch pieces 87 and 88. These latch pieces have beveled edges 89 and 90, and are held in an uppermost position by the compression springs 91 and 92. The gap between the latch pieces 87 and 88 is wide enough to accommodate the extension 76 of the plate 73 and in addition provide the requisite clearance, such as is shown in Fig. 3, to prevent rebounding of the extension 76 before it is caught in the latch.

Having described my apparatus, I will show its operation.

In Fig. 1 the vapors from the still 2 pass up through the tower 1, are sorted by the trays in the upper portion of this tower, pass out through the pipe 8, are condensed in the condenser 9, and are held in tank 10, from which the desired portion flows by gravity through the pipe 12 to the pump 13.

Assuming that the tower 1 has just been started up with vapors entering it. The galvanometer has been set at its zero reading by the variable resistance 24, and the shaft 29 and the chopper 27 are in motion. As the temperature in the tower 1 rises—there being as yet no flow pipe 44—the desired temperature will be exceeded and the galvanometer needle 22 will swing under bell crank 26 to move it by the action of chopper 27. This will cause bar 35 to cant and be contacted by cam 31 in its revolution. Each contact will close the circuit of battery 41, open solenoid valve 43 and start motor 56. The solenoid valve 42 being normally open and solenoid valve 43 being opened, maximum flow will pass through the auxiliary pipes 47 and 48. The result of the starting of the motor 56 is to cause the worm 68, Fig. 3, to turn the worm wheel 67. The extension 76 being held in the latch 78, the plate 73 can not move, but the revolving of the worm wheel 67 affects the springs 71 and 72 so that in this movement of the worm wheel both springs are compressed against the reduced portions 82 and 83. However, the cam 70 being integral with the wheel 67, will revolve with it and at the time the springs 71 and 72 are being compressed the extension 76 is being withdrawn from the latch 78 by the action of this cam on plate 73. This continued rotation of the worm wheel 67 stores up energy in the two springs 71 and 72 so that at the time the cam 70 has withdrawn the extension 76 from the latch 78, the stored up energy of the springs causes the extension 76 and the plate 73 to swing around with a quick movement until the extension 76 is stopped and retained by the next succeeding latch, such as 79. It will be understood that in this movement the plate 73 has caught up with the cam 70, so that in the rotation the plate 73 with its extension 76 are forced outward again into a position corresponding to that shown in Fig. 1, only the retaining will be done by the latch 79, instead of 78. The valve stem 61 being fast to the plate 74, the rotation of this plate by plate 73 necessarily rotates the valve to open it. Therefore, in Fig. 1 the liquid from the pump 13 will begin to pass not only to the auxiliary pipes 47 and 48, but also to the main pipe 45 into the common pipe 44, and thus into the tower through 52 and 53, and cooling of the vapors will commence. As long as the temperature of the tower 1 is below that desired, the operation described in the opening of valve 54 will continue. That is, the motor 56 will continue to run and the plate 73 of Fig. 3 will continue to intermittently revolve from latch to latch in succession and open the valve 54 until the temperature in the tower 1 is approximately that desired, and when this happens the galvanometer needle 22 of Fig. 1 will seek its mid-position, releasing bell-crank 25 and the cam 30 will force the bar 35 into a more or less horizontal position and there will be no further contact between this cam 30 and the contact piece 38, so that the circuit, including the battery 40, the solenoid valve 42, and the motor leads 59 and 60 will remain open. Consequently, the motor 56 stops, and with it the worm wheel 67, so that the extension 76 in Fig. 3 will remain in whatever latch it happened to be when the motor stopped. The temperature of the still being at approximately the correct temperature, the function of the main valve 54 has been accomplished, and it will remain in the position that it was when the motor stopped, and hereafter the finer or minor control of the temperature in the tower 1 will be accomplished by means of the solenoid valves 42 and 43, acting to control the by-pass flow of the liquid through the auxiliary pipes 47 and 48. As the temperature in the tower 1 varies from that exactly predetermined the galvanometer needle 22 will throw to one side or the other, depending upon whether the temperature is under or over the desired one, and accordingly either of the bell cranks 25 or 26 will be affected to cant the bar 35 about the pivot 36 and make intermittent contacts with either cam 30 or 31, depending upon which bell crank is actuated. This contact will serve to close the circuit of either the solenoid valve 42 or 43, and admit more or less of the cooling liquid through the auxiliary pipes 47 or 48. Likewise the closing of either circuit will serve to pass current through the motor leads 59 and 60, or 57 and 58, and the motor 56 will run in the direction depending upon which motor leads carry the current. By reason of the continuous rotation of the cam 31, and the intermittent contact between these cams and the bar 35, the motor 56 will be energized in a like intermittent manner and will reverse its direction accordingly, and carry with it the worm wheel 67. However, the movement of this wheel 67 resulting from the motor is not sufficient to release the extension 76 from its latch before the motor reverses because of the intermittent contacts mentioned before, so that the worm wheel 67 will tend to hunt backwards and forwards within a limited range and without affecting the valve 54. This hunting movement is not sufficient to draw out the extension 76 from its latch and the only result is to compress the springs 71 and 72 in alternate directions. From the foregoing, it will be seen that the solenoid valves 42 and 43 in Fig. 1 are energized or remain quiet according to the position of the bar 35 which in turn takes its position from the galvanometer needle 22, swinging to one side or the other, according to the slight changes in temperature in the tower 1. Normally the solenoid valve 42 is open and the solenoid valve 43 is closed, and if the correct temperature is maintained they will remain so because the galvanometer needle 22 is in its mid-position and the bar 35 is out of contact with either of the cams 30 or 31. If the temperature in the tower 1 should rise above that which has been predetermined the galvonometer needle 22 will swing to the right under bell crank 26 to throw the bar 35 in a position opposite to that shown in the dotted line in Fig. 1. Therefore contact will be made between this bar and the cam 31 to close the circuit of the battery 41, and open solenoid valve 43 to admit more cooling liquid through the auxiliary pipe 48 and thus to the tower 1. In this case the motor 56 would run and cause the wheel 67 of Fig. 3 to move in a corresponding direction. However, before this movement would be extensive the temperature in the tower 1 would fall, the bar 35 move to an approximately horizontal position because of the cam 31, and the circuit of battery 41 would be open and therefore the solenoid valve 43 would close and the motor stop. If the temperature in the tower should fall, the reverse operation would take place, the bar 35 move into the dotted position shown, the solenoid valve 42 close, and the motor 56 and the worm wheel 67 rotate in the opposite direction. The solenoid valve 42 being thus closed and the solenoid valve 43 being already closed less cooling liquid would flow to the tower because none would go through the auxiliary pipes 47 and 48. A slight change in temperature in the tower 1 being sufficient to cause the galvanometer needle 22 to swing under either bell crank 25 or 26, it will be seen that the bar 35 will be canted in one direction or another and make intermittent contact with the cam 30 and 31 to close the circuits of the batteries 40 and 41 in a like intermittent manner, and this naturally results in the intermittent opening and closing of solenoid valves 43 and 42, to control the flow of the liquid to the auxiliary pipes 47 and 48. The motor and the worm wheel 67 merely hunt backwards and forwards without changing the valve 54. The solenoid valves 42 and 43 being of the constant opening type, either open or close to their full extent so that the passage of the fluid through them is a function of the time of opening and not of the extent of opening, because that extent is always the maximum and therefore constant. This being so, the flow of the fluid through the auxiliary pipes 47 and 48 will be in the nature of a series of puffs or gusts, the duration of which depends upon the length of time which the valves are open. These puffs or gusts will naturally be more marked or violent near the valve, but in the passage through the pipes 49 and 44 they may be smoothed out to give a practically continuous flow into the tower 1 if desired. It should be remarked that the valve 54, after having reached the point of correct opening as hereinbefore described, will not change its opening under the normal slight variations of temperature which are taken care of by the solenoid valves. However, if for any reason the temperature in the tower 1 should vary greatly the solenoid valves will then be unable to correct this difference and the valve 54 would then be influenced by the motor 56 for a longer period which would cause a correspondingly longer rotation of the worm wheel 67 and the extension 76 of the plate 73 would be withdrawn from its latch as before and either open or close the valve depending upon whether or not the temperature was too great or too little. In other words, the valve 54 automatically takes care of sustained differences in temperature, and establishes the approximate temperature after which the solenoid valves would again function to maintain that temperature. I also provide in case of emergencies hand operation for this valve, which is shown at 93 in Fig. 1. This hand operation is not essential but may be provided purely for purposes of emergency.

I have described my invention in its preferred form, but it is obvious that many changes and variations may be made in the structure without departing from the principles which I have set forth. For instance, Figs. 6 and 7 show variations in the method of attaching the worm wheel 67 to the spindle 63. In Fig. 6 I show means whereby the worm wheel 67 may have a degree of movement about the shaft 63 before that shaft is moved. On the shaft 63 is a key 94 which sits in a recess 95 of the hub of the worm wheel 67. On this hub I place two adjustable stops 96 and 97 which are circumferentially adjustable by means of the bolts 98 and 99 working in slots as shown. Therefore, by changing the position of these slots I can limit the free rotation of the wheel 67 within the bounds as determined by these slots. The advantage of this variation is that when the worm wheel hunts as previously described it will do so without having any effect whatever on the valve spindle 61, and it will only be when the key 94 abuts either of the stops 97 or 96 that the aforesaid spindle will be affected to operate the valve.

In Fig. 7 is a variation similar to that in Fig. 6 except that no adjustment is provided. The key way 102 is made sufficiently wide to take care of the hunting of the worm wheel 67 and only when the key 94 abuts the sides of this key-way will the valve spindle 61 be moved to change the setting of the valve.

Figure 2:
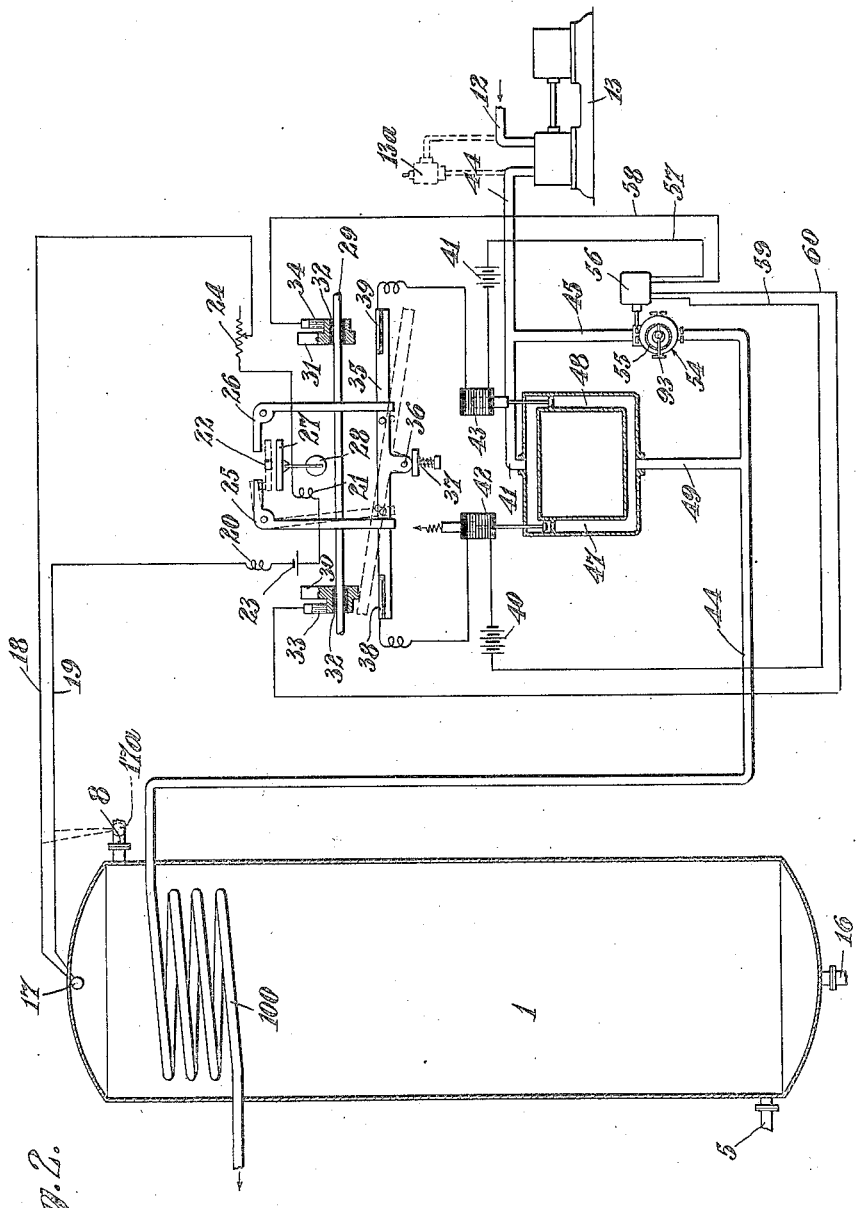
Fig. 2 is a variation of Fig. 1, where the cooling is effected by means of a coil at the uppermost part of the tower.

In Fig. 2, I show a variation of cooling means to which my regulating apparatus is adaptable. The tower 1 is the same as that of Fig. 1, except that it is shown diagrammatically, and similar numbers apply to similar parts throughout. Instead of using and returning to the system the cooled vapors as heretofore described, I replace the discharge nozzles 52 and 53 and the equalizing tanks 50 and 51 by a water coil 100. In this event the vapors passing out of pipe 8 from the tower would pass to a condenser or be disposed of in any manner customary in oil refining processes. Therefore, the pipe 12 of the pump 13 instead of taking condensed vapors would be connected to a source of cold water or other temperature modifying medium, and this water would pass through the same pipes as before and into the coil 100 from whence it will be discharged and disposed of in any convenient means, such as to a waste pipe or to a cooler for re-use. Except for the substitution of the water coil as a means of cooling the vapors in the tower 1, my apparatus remains the same, and the temperature control in the top of the tower 1 or at the outlet 17ª is maintained through the volume of cooling medium being regulated as previously described in relation to Fig. 1.

It would be simple in the case of coils as shown in Fig. 2, to use them in many cooling operations, especially for refrigeration. In such case the refrigerating medium would pass in at the pipe 44 and be controlled in exactly the same way as water or other comparatively low temperature refrigerants are controlled. Therefore, my invention is not limited to strictly oil refining processes, although I have chosen that form to illustrate my invention; but it may be used in a great variety of ways, either to maintain a high temperature or a low one. In fact, the ingoing fluid to the pipe 44 may be of either high or low temperature, because that temperature is not material to the operation of my device, but is merely used as a means of temperature control as determined in amount by my invention in response to temperature variations from a predetermined level.

I claim as my invention:

1. In an apparatus for temperature control, the combination of a means to determine variations from a given temperature at a given point, and means to control the flow of a temperature modifying medium to maintain that temperature, said control means including a minor control to apply small corrections and a major control to apply a correction when the minor corrections reach a predetermined amount.

2. In an apparatus for temperature control, the combination of means to determine temperature variations at a given point, means to translate the temperature variations into proportional times of operation of regulating means affecting a temperature modifying medium and means for regulating the temperature modifying medium, said regulating means including mutually responsive devices; the one accomplishing small increments of regulation and the other accomplishing a single regulation when the sum of the small increments reaches a given amount.

3. In an apparatus for temperature control, the combination of a cooling tower, means to determine variations from a predetermined temperature therein, intermittently contacting means to translate such variations into periods of regulation of a regulating device to control the flow of a temperature modifying medium to said tower, and means to effect the flow of the temperature modifying medium to said tower, said regulating device comprising a minor control for small increments of change and a major control to effect a change at a given point of integration of the small increments.

4. In an apparatus for temperature control, the combination of a dephlegmator tower, means to determine the temperature therein, intermittent contacting means to translate variation in the temperature into proportional times of regulation of a temperature modifying medium, a minor control to effect small increments of regulation and a major control to integrate said increments of minor control and effect a larger increment of control at a given point of the integration and means to effect the flow of the temperature modifying medium to the tower.

5. In an apparatus for temperature control, means to determine temperature at a given point, means to supply a temperature modfying medium to affect the temperature at that point, means to control said medium to establish a predetermined temperature, other means to control said medium to maintain the predetermined temperature and intermittent contacting means to control both of said controlling means in response to temperature variations at the given point.

6. In an apparatus for temperature control, means to determine temperature at a given point, means to control a temperature modifying medium to establish a selected temperature at the given point, means to maintain that temperature by other means to vary the flow of the temperature modifying medium established by said first control means in amounts of over-sufficiency or under-sufficiency in response to variations from the selected temperature and means to effect the flow of temperature modifying medium to the point of temperature control.

7. In an apparatus for temperature control, a dephlegmator tower, a carrier for a temperature modifying medium therein, means to effect a flow of the temperature modifying medium to the tower, means to determine the temperature at a selected point in the tower, means to translate variations from a predetermined temperature into periods of time over which a regulation of said flow is effective, regulating means to accomplish that regulation in small increments of correction and other regulating means to integrate those corrections and apply a major correction at a given magnitude of the integration.

8. In an apparatus for temperature control, the combination of means to control by increments of regulation a temperature modifying medium in response to temperature changes at a given point and other means to integrate those increments and apply a separate increment of regulation when said integration reaches a given sum.

9. In an apparatus for temperature control, means to determine temperature at a given point, means to supply a temperature modifying medium to maintain the heat level at that point at a desired temperature, a normally closed valve for affecting the supply of temperature modifying medium, regulating means responsive to the temperature changes to actuate said valve to full opening for corrections below the desired heat level, a normally open valve for reversely affecting the supply of said medium and adapted to be actuated by said regulating means to a closed position to effect corrections above the desired heat level.

10. In an apparatus for temperature control, a dephlegmator tower, means to determine temperature at a given point therein, means to supply a temperature modifying medium to affect the temperature at that point, and variable regulating means for the modifying medium responsive to temperature changes at the given point to effect corrections, the amount of each correction being predetermined by the condition of the temperature.

11. In an apparatus for temperature control, a dephlegmator tower, means to determine temperature at a given point therein, means to supply a temperature modifying medium to maintain the desired temperature at the selected point, and regulating means to effect corrections above and below the desired temperature in response to corresponding temperature changes, each of which corrections is variable and predetermined in amount.

12. In an apparatus for temperature control, a dephlegmator tower, a carrier for a temperature modifying medium therein, means to predetermine temperature at a given point, regulating means adapted to regulate the temperature modifying means in small increments of correction of an amount predetermined by the condition of the temperature, and means to translate variations from the predetermined temperature into a proportional number of increments of correction of the regulating means.

13. In an apparatus for temperature control, a dephlegmator tower, a carrier for a temperature modifying medium therein, means to predetermine temperature at a given point, means to translate variations from the predetermined temperature into intermittent and variable movement of a regulating means for the temperature modifying means, said regulating means being adjustable for extent of movement.

14. The method of temperature regulation of a tower, which comprises predetermining a heat level therein, supplying a heat modifying medium to the tower, maintaining that heat level by increments of regulation of the heat modifying medium proportional to the deviation of temperature from the predetermined level, adding those increments in the direction of the variation and effecting another regulation when the sum of the increments in one direction reach a given amount.

15. The method of temperature control in a tower, which comprises establishing a predetermined temperature level therein, intermittently actuating a regulating device in periods of time proportional to the variations from the established temperature level, adding the variations on another control, and causing that control to operate when the variations reach a given sum in one direction.

16. The method of temperature control of a tower, which comprises supplying a temperature modifying medium thereto in an amount sufficient under normal operating conditions, to maintain the temperature therein at a predetermined level and, when the conditions so depart from normal as to effect a change in the temperature, adding to or deducting from the amount of temperature modifying medium in units of quantity, the amount of each unit depending upon the extent of the temperature variation from the predetermined level.

17. The method of temperature control of a tower, which comprises applying a correction of a temperature modifying medium in units of quantity of an amount dependent upon the extent of temperature variation from a predetermined level, and applying another correction of a continuous amount when the sum of the first corrections in a given direction of temperature change reach a given sum.

In testimony whereof, I have signed my name to this specification this 4th day of February, 1925.

LUIS DE FLOREZ.